Feb. 3, 1931.  H. WHITBY  1,790,963
MOTOR VEHICLE
Filed Nov. 28, 1927  2 Sheets-Sheet 1
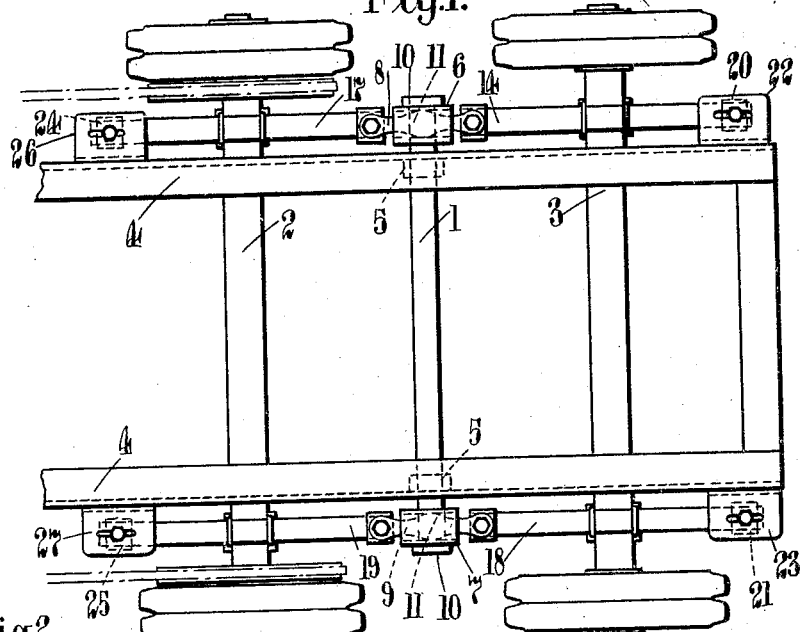
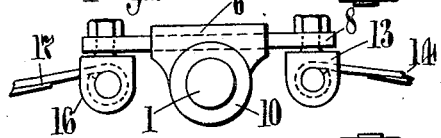
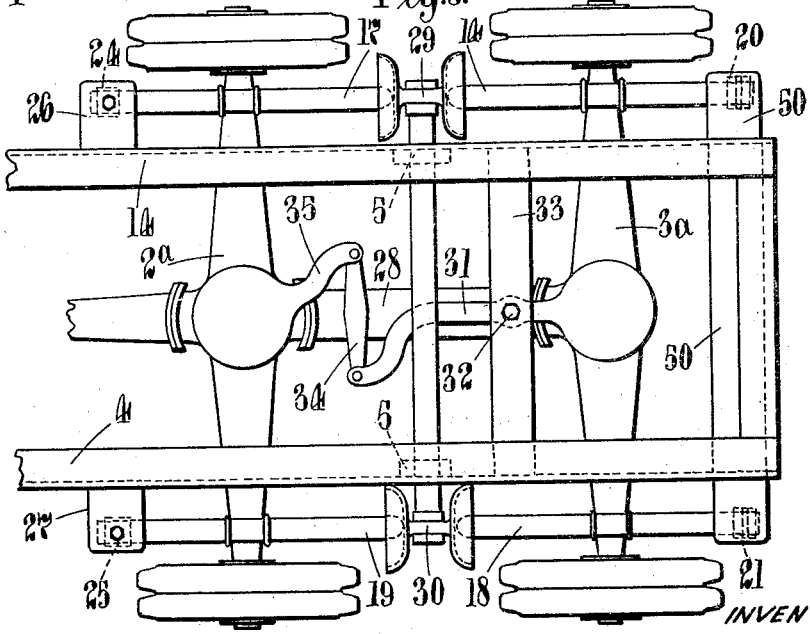
INVENTOR
H. WHITBY,
BY Jno Irivie
ATTORNEY

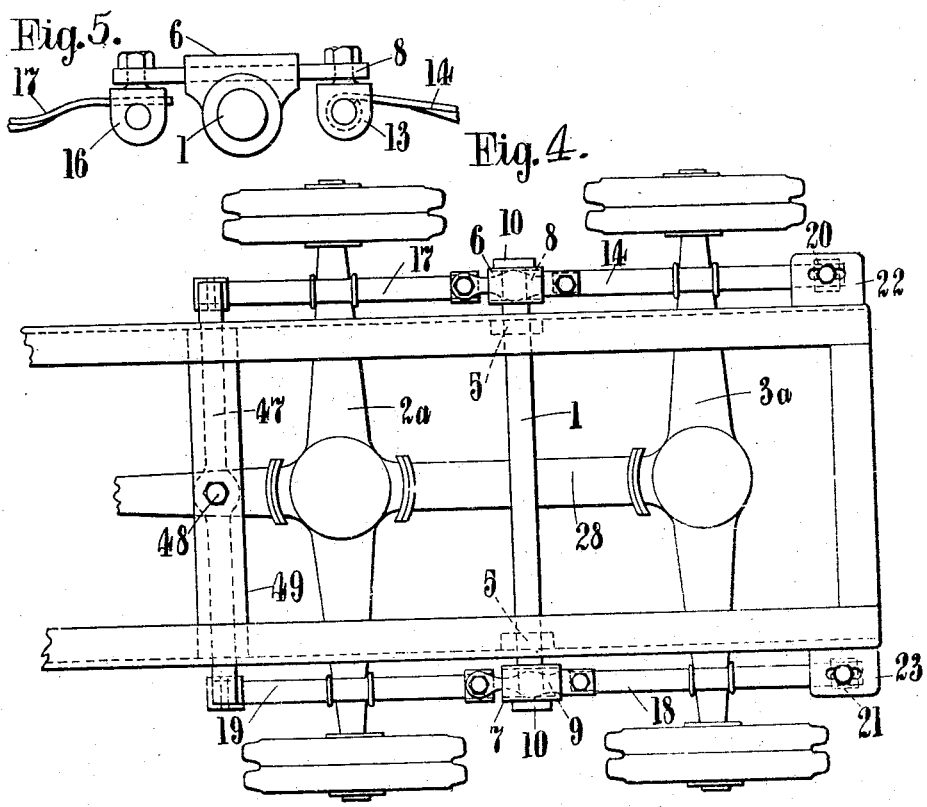

Patented Feb. 3, 1931

1,790,963

UNITED STATES PATENT OFFICE

HOLLY WHITBY, OF PONDERS END, ENGLAND

MOTOR VEHICLE

Application filed November 28, 1927, Serial No. 236,283, and in Great Britain March 8, 1927.

My invention relates to motor vehicles, and is especially applicable to the rigid-frame six-wheeled type of such vehicles.

The object of my invention is to provide an improved arrangement of motor vehicle having a rigid frame and six or more wheels, in which manœuvring movements of the vehicle are greatly facilitated.

My invention consists in the improved motor vehicles, to be hereinafter described.

Referring now to the accompanying drawings, which are of a diagrammatic nature,

Figure 1, shows a plan of the rear portion of a six-wheeled chassis, arranged according to my invention.

Figure 2, shows a detail view of one of the shackle-plates with its housing, as illustrated in Figure 1.

Figures 3 and 4, show plan views of modified arrangements of chassis to that shown in Figure 1.

Figure 5, shows a detail view of one of the shackle-plates with its housing, as illustrated in Figure 4.

In carrying my invention into effect, according to one form, and as applied by way of example to a rigid-frame, six-wheeled vehicle, I arrange on the rear portion of the chassis frame, a shackle-bar, 1, Figures 1 and 2, which is located between the axles, 2 and 3.

The shackle-bar, 1, is secured in position on the longitudinal members, 4, of the chassis frame by collars, 5, and its ends project laterally beyond these members on each side of the chassis.

On the projecting ends of the shackle-bar, 1, housings, 6 and 7, for the shackle-plates, 8 and 9, respectively are mounted. The housings, 6 and 7, are retained in position on the shackle-bar, 1, by means of the collars, 10, the arrangement being such that the housings while rotatable on the shackle-bar are not slidable longitudinally thereon.

The housing, 6, is of inverted channel section, and the shackle plate, 8, has a central portion, 11, of greater width than the end portions thereof, the edges of the central portion forming parts of a cylindrical surface. The housing, 7, and the shackle-plate, 9, are of similar construction to the housing, 6, and the shackle-plate, 8.

The shackle-plate, 8, is arranged between the shackle-bar, 1, and the inner surface of the top of the housing, 6, the shackle-plate, 9, being similarly arranged in the housing, 7.

The shackle-plate, 8, bears on the sides of the housing, 6, at diametrically opposite points of its central portion, 11, and the arrangement is such that the shackle-plate may slide longitudinally in its housing and also may swivel or pivot on the partly cylindrical surfaces of its central portion.

The shackle-plate, 9, may similarly slide longitudinally and also swivel or pivot in its housing, 7.

On the rear end of the shackle-plate, 8, Figure 2, the shackle, 13, for the forward end of the spring, 14, is rotatably mounted on a vertical axis, while on the forward end of this shackle-plate, the shackle, 16, for the rear end of the spring, 17, is also rotatably mounted on a vertical axis.

Similarly, on the rear end of the shackle-plate, 9, the shackle for the forward end of the spring, 18, is rotatably mounted, while on the forward end of this shackle-plate, the shackle for the rear end of the spring, 19, is rotatably mounted. The shackles on the shackle-plate, 9, are of similar construction and are mounted thereon in a similar manner to those on the shackle-plate, 8.

The shackles, 20 and 21, for the rear ends of the springs, 14 and 18, respectively, are slidably and rotatably mounted on vertical axes on the brackets, 22 and 23, attached to the chassis frame.

Similarly, the shackles, 24 and 25, on the forward ends of the springs, 17 and 19, are slidably and rotatably mounted on vertical axes on the brackets, 26 and 27, attached to the chassis frame. The shackles, 20, 21, 24 and 25, are of similar construction to the shackles, 13 and 16.

In the above arrangement, the wheels on the axle, 2, are driven by chain drives, while the wheels on the axle, 3, are not driven. Torque rods of the usual type are provided for the axle, 2.

The shackle plates, 8 and 9, in the arrangement above described may slide longitudinally in their housings in response to load and other deflections or movements of the springs attached thereto, while the shackles, 20, 21, 24 and 25, may also slide longitudinally on the brackets on which they are carried to accommodate for load and other deflections or movements of the springs.

As the adjacent ends of the springs, 14 and 17, and those of the springs, 18 and 19, are interconnected by their respective shackle-plates, these ends may swing laterally in opposite directions, when required.

When the front wheels of a vehicle fitted with the arrangement above described are moved for steering or turning purposes, when the vehicle is in motion, a sidewise relative movement of the chassis frame and the rear wheels takes place during the initial turning movement, and causes the springs, 14 and 18, to be swung in the same direction laterally about the connections of their shackles, 20 and 21, to the brackets, 22 and 23, and simultaneously therewith, the springs, 17 and 19, to be swung laterally about the connections of their shackles, 24 and 25, to the brackets, 26 and 27, but in the opposite direction to that of the springs, 14 and 18, with the result that the axles, 2 and 3, and the wheels thereon automatically position themselves correctly or approximately correctly for enabling the steering or turning movement to be effected without substantial skidding of the four rear wheels taking place.

By interconnecting the springs in the manner above described the positioning movements of the four rear wheels are co-ordinated.

On the completion of the steering or turning movement, the wheels automatically return to the position shown in Figure 1.

In Figure 3, I have shown a modification of the arrangement shown in Figure 1. In Figure 3, the axles in both of the casings, 2a and 3a, are driven by a shaft drive, a torque tube, 28, with ball joints at each end being interposed between the axle casings.

The shackles, 24 and 25, for the forward ends of the springs, 17 and 19, are pivoted so as to be rotatable about vertical axes on the brackets, 26 and 27, respectively, while the rear ends of the springs, 14 and 18, are mounted on horizontal pivots on opposite ends of the bar, 50, which is capable of sliding laterally and also longitudinally on the chassis frame. The connections between the springs, 14 and 18, and the bar, 50, are such as to prevent lateral swinging movements of the springs on their pivots. The forward ends of the springs, 14 and 18, are mounted in the housings, 29 and 30, respectively, rotatably mounted on the shackle-bar, 1, while the rear ends of the springs 17 and 19, are also mounted in these housings.

The housings, 29 and 30, are formed so as to permit lateral and longitudinal movements of the springs housed therein.

The axle casing, 3a, is provided with an arm, 31, which is pivoted on the pivot, 32, mounted on the cross-member, 33, of the chassis frame. The forward end of the arm, 31, is interconnected by means of a link, 34, with the arm, 35, which is provided on the axle casing, 2a.

The pivot, 32, and the joints between the ends of the link, 34, and the arms, 31 and 35, are such as to allow for the relative movements of the chassis frame and the axle casings, 2a and 3a, caused by deflections of the springs, 14, 17, 18 and 19.

When steering or turning movements of the vehicle are being effected, the relative lateral movement of the chassis frame and the adjacent ends of the rear wheels causes the springs, 14, 17, and 18, 19, all to be swung laterally in the same direction by the arms, 31 and 35, and the link, 34, with the result that the axle casings, 2a and 3a, are inclined towards one another and the wheels assembled on the axles in these casings are automatically positioned in co-ordinated manner to effect the required movement without skidding of the rear wheels.

In Figure 4, I have shown a further modification. In this case, the forward ends of the springs 17 and 19 are attached to horizontal pivots on opposite ends of the bar 47, which is mounted on the pivot 48 on the cross-member 49 of the chassis frame, the connections between these springs and their pivots being such as to prevent lateral swinging movements of the springs thereon.

The rear ends of the springs 17 and 19 are slidably mounted on the shackles attached to the forward end of the shackle-plates 8 and 9. The shackle-plate 8 and its housing 6 are shown in Figure 5, the rear end of the spring 17 being slidably mounted in the shackle 16 while the forward end of the spring 14 is connected to the shackle 13, both of the shackles 15 and 16 being rotatably mounted on vertical axes on the shackle-plate.

The shackle-plate 9 and its connections to the springs 18 and 19, are arranged in a similar manner to that of the shackle-plate 8 and the springs 14 and 17.

In the above arrangement during turning or steering movements of the vehicle, the axle casing 2a pivots about the pivot 48, while the axle casing 3a is displaced laterally substantially parallel to itself and in the opposite direction to that in which the axle casing 2a moves.

In the arrangements shown in Figures 3 and 4, when effecting a turn, the centre lines of the axle casings, 2a and 3a, and the centre lines of the front wheels, when produced intersect approximately at a common point.

Instead of forming the shackle-plates as above described, I may form them with slots in which the shackles are slidably mounted, or they may be formed with a spherical surface at the centre of their lengths and assembled in correspondingly formed bearings slidably mounted in the shackle-plate housings, or the shackle-plates may be mounted universally in any other suitable manner.

The axles, 2 and 3, and the axle casings, 2a and 3a, in the arrangement hereinbefore described, may be rigidly attached to their co-acting springs, or the springs may be connected to the axles or axle casings so as to be pivotable about vertical axes.

Also, in the arrangement shown in Figure 1, the wheels on the axle, 2, only are driven by chain drives. I may, however, in some cases, arrange for only the wheels on the axle, 3, to be driven, or for both sets of wheels to be driven by chain drives, while in other cases, I may arrange for one or both sets of wheels to be driven by a shaft or other type of drive.

Again, in the arrangement shown in Figures 3 and 4, the axles of both of the sets of rear wheels are illustrated as being driven by a shaft drive, but I may arrange for only one of the sets of rear wheels to be driven by a shaft drive, while in other cases, I may arrange for one or both sets of wheels to be driven by chains or other forms of transmission.

By means of my invention, it will be seen that an improved arrangement of rigid-frame six-wheeled vehicle is provided, the four wheels of which may partially or completely automatically position themselves in a co-ordinated manner when steering or turning movements of the vehicle are being carried out and on the completion of these movements automatically return to their original positions.

Steering or turning movements may thus be effected without substantial skidding or side-slipping of the four rear wheels, thereby materially reducing the wear on the tyres and at the same time greatly facilitating the manœuvring of the vehicle.

Further, the spacing of the two rear axles may be increased in comparison with the spacing of the usual type of six-wheeled vehicles and a better distribution of the load effected.

Although I have described my invention as applied by way of example to a six-wheeled vehicle, it may be applied to vehicles with a greater number of wheels.

Modifications may be made in the examples of my invention above described.

I claim:—

1. In combination in a motor vehicle, a frame, a plurality of sets of rear wheels mounted on said frame, the forward set of said rear wheel sets being pivotable on said frame about a point on the center line of said frame in advance of the center line of said forward wheel set, while the rear set of said rear wheel sets are displaceable laterally on said frame and in co-ordinated relationship with said forward wheel set.

2. In combination in a motor vehicle, a frame, a plurality of sets of rear wheels for said frame, axle casings for the axles of said rear wheel sets, the forward axle casing of said rear wheel sets being pivotable about a point on the center line of said frame in advance of the center line of said forward axle casing while the rear axle casing of said rear wheel sets is displaceable laterally of said frame and in co-ordinated relationship with said forward axle casing.

3. In combination, in a motor vehicle, a frame, a plurality of sets of rear wheels mounted on said frame, spring sets for each set of said rear wheels, said spring sets being interconnected with one another to permit co-ordinated movements of said wheels, when turning.

4. In combination, in a motor vehicle, a frame, a plurality of sets of rear wheels mounted on said frame, axle casings for the axles of said wheels, spring sets for each of said axle casings interconnected with said frame and to one another to permit co-ordinated swinging movements of said axles and said wheels, when turning.

5. In combination, in a motor vehicle, a frame, a plurality of sets of rear wheels for said frame, axle casings for the axles of said wheels, springs attached at intermediate points in their lengths to each of said axle casings, the adjacent ends of said springs being linked together while the other ends of said springs are interconnected with said frame to permit co-ordinated swinging movements of said axles and wheels when turning.

6. In combination in a motor vehicle, a frame, a plurality of sets of rear wheels for said frame, axle casings for the axles of said wheels, springs attached at intermediate points in their lengths to each of said axle casings, members pivotably and slidably mounted on said frame and interconnecting adjacent ends of corresponding springs of said spring sets, the other ends of said springs being interconnected with said frame to permit co-ordinated movements of said axles and wheels when turning.

7. In a motor vehicle, the combination of a frame, a plurality of sets of rear wheels for said frame, axle casings for the axles of said wheels, spring sets attached at intermediate points in their lengths to each of said axle casings, members pivotably and slidably mounted on said frame interconnecting adjacent ends of the springs of said spring sets, a member pivoted centrally on said frame connected to corresponding ends of the forward set of said springs together with pivotal connections to said frame for corresponding ends of the rear set of said springs.

8. In a motor vehicle, the combination of a plurality of sets of rear wheels, separate spring sets for each set of wheels, members pivotably and slidably mounted on said frame interconnecting adjacent ends of said springs together with pivoted connections with said frame for the other ends of said springs to permit co-ordinated swinging movements of said wheels, when turning.

In testimony whereof I have signed my name to this specification.

HOLLY WHITBY.